R. DE FILIPPIS.
AUTOMATIC STEERING DEVICE FOR VEHICLES.
APPLICATION FILED AUG. 14, 1919.
1,357,491.
Patented Nov. 2, 1920.
2 SHEETS—SHEET 1.
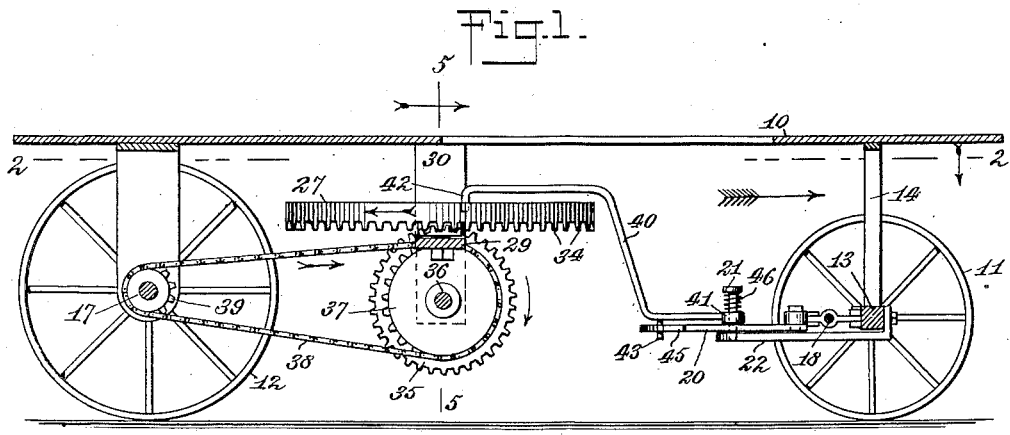
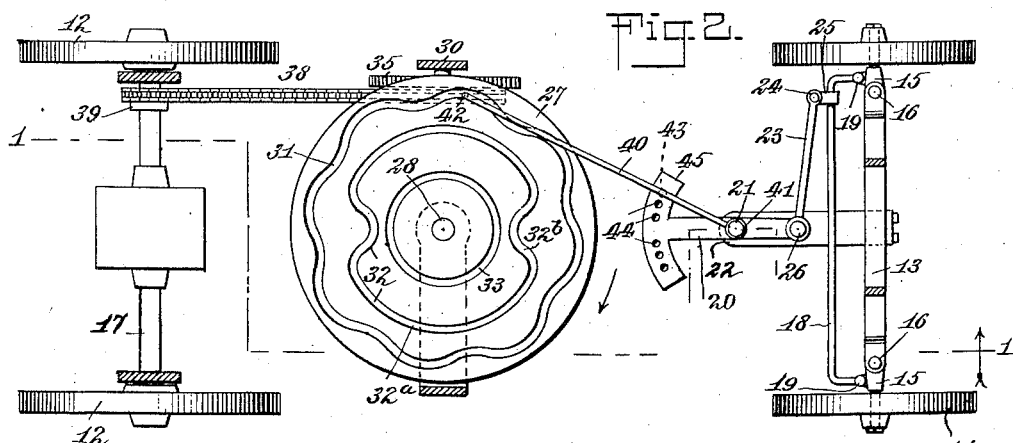
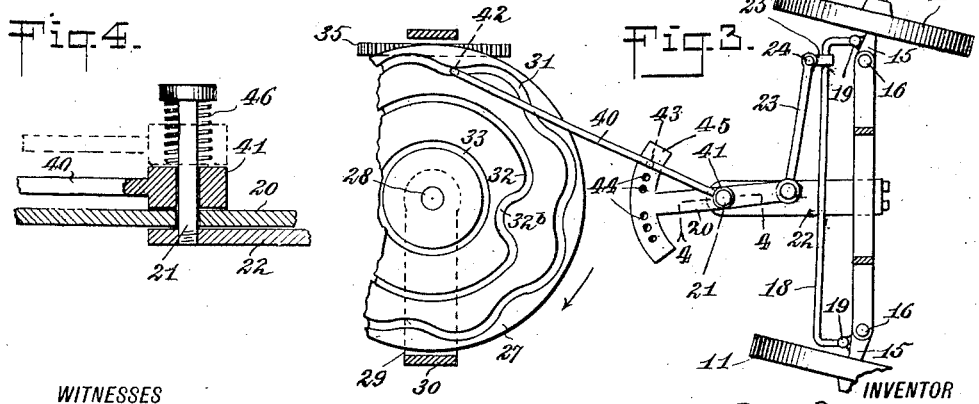
WITNESSES
INVENTOR
R. de Filippis
BY
ATTORNEYS

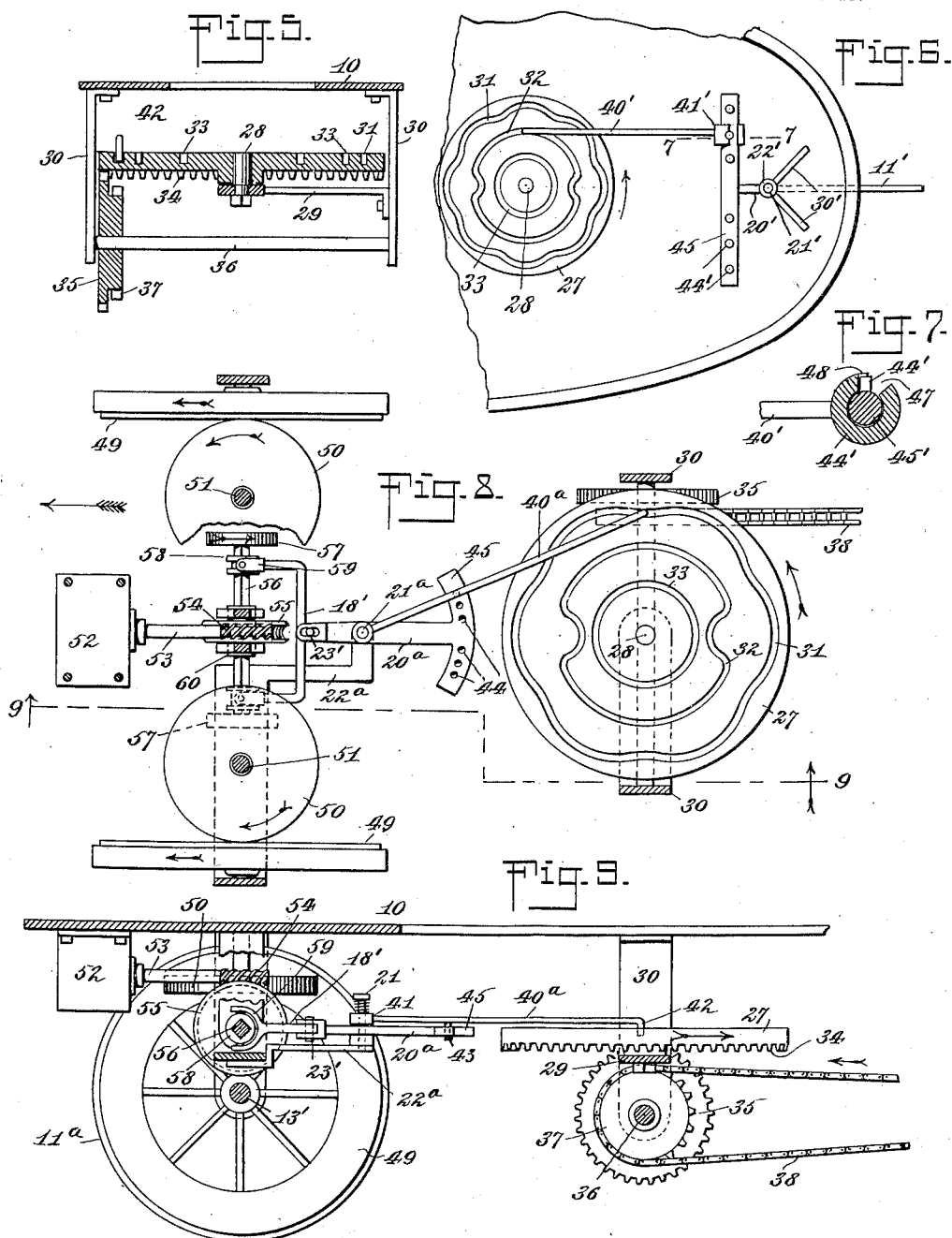

UNITED STATES PATENT OFFICE.

RAYMOND DE FILIPPIS, OF BROOKLYN, NEW YORK.

AUTOMATIC STEERING DEVICE FOR VEHICLES.

1,357,491.      Specification of Letters Patent.      Patented Nov. 2, 1920.

Application filed August 14, 1919. Serial No. 317,562.

*To all whom it may concern:*

Be it known that I, RAYMOND DE FILIPPIS, a citizen of the United States, and a resident of the city of New York, borough of Brooklyn, in the county of Kings and State of New York, have invented a new and Improved Automatic Steering Device for Vehicles, of which the following is a full, clear, and exact description.

This invention relates to the control of vehicles with respect to the lateral steering thereof, and irrespective of whether such vehicles are adapted for use on land, in the sea, or in the air. The term "vehicle" therefore as used herein, except as specifically limited, is to be given its broad interpretation. I wish it to be understood also that while the improvement is designed primarily for use in connection with toy vehicles, it is not to be limited in practice to such devices.

Among the objects of the present improvement is to provide in connection with a steering member, such as a wheel or wheels, or a rudder, a rotary actuator and a connector between the actuator and the steering member, the actuator being provided with means to variably actuate the connector or a member associated with the connector to cause during the rotation of the actuator any desired control of the steering means either for a straight-away course or for the turning of the vehicle laterally in either direction to any extent and throughout any desired period of time.

Another object of the invention is to enable the operator to adjust the connector with facility in order to effect any desired control of the steering means.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section on the broken line 1—1 of Fig. 2.

Fig. 2 is a horizontal section on the line 2—2 of Fig. 1, the principal parts being in plan and with the steering means in position for straight-away operation.

Fig. 3 is a view corresponding to Fig. 2 with the connector having the same adjustment as in Fig. 2 but with the actuator by virtue of its automatic action imparting a momentary right turn to the steering means.

Fig. 4 is an enlarged vertical sectional detail of the connector on the line 4—4 of Fig. 3.

Fig. 5 is a vertical transverse section on the line 5—5 of Fig. 1.

Fig. 6 is a plan view of a modification of the invention applied to a boat or airship.

Fig. 7 is an enlarged sectional detail on the line 7—7 of Fig. 6.

Fig. 8 is a plan view with parts in section showing another modification with the application of my improvement to a frictional driving means for a vehicle; and Fig. 9 is a vertical longitudinal section on the line 9—9 of Fig. 8.

Referring now more specifically to the first set of figures I show my invention applied to a wheeled vehicle comprising a body or frame 10, front wheels 11, rear wheels 12, a front axle 13 held rigidly to the body by uprights 14 and having steering knuckles 15 jointed at 16 to the ends of the axle similar to the usual automobile practice, and a rear driving axle 17 adapted to be driven by any suitable motor not shown, or the vehicle may be otherwise propelled or driven, but with which power or driving means I am not particularly concerned in this instance. Suffice it to say, however, that the front and rear axles 13 and 17 are maintained substantially parallel to each other at all times. A reach rod 18 is located just back of the front axle and approximately parallel thereto and has its ends pivotally connected at 19 to the knuckles 15.

The connector above referred to in one of its forms is shown at 20 in the nature of a lever fulcrumed on a fixed vertical pin 21 secured in the rear end of a horizontal support 22 secured to the center of the front axle and extending rearward therefrom. By reason of the means for connecting the front axle to the vehicle body the support 22 is rigid with respect to the vehicle and projects in a direction perpendicular to the two axles. A link 23 is pivotally attached at 24 to a clip 25 fixed to the reach rod 18 and likewise connected at its other end at 26 to the front end of the connector. As far as thus described the steering knuckles are free to turn around their vertical pivots 16 and the connector is likewise free to turn around its vertical pivot pin 21.

The automatic actuator in this form of the invention is indicated at 27 as essentially a disk journaled for rotation around a vertical axis 28 supported by an arm 29 constituting a part of an actuator frame 30 depending from the body between the front and rear axles. The upper or active face of the disk 27 is provided with actuating means of any suitable nature for a member coöperating with the connector to cause the steering of the vehicle. This actuator means is shown herein as comprising a plurality of grooves 31, 32 and 33 formed in the upper face of the disk and having, generally speaking, a concentric arrangement with respect to the axis 28. The groove 31 is sinuous throughout its circumferential extent, being composed of a succession of bends in radial directions. The next groove 32 comprises one or more arc shaped portions 32$^a$ concentric with the axis 28, shown herein as two in number and approximately semi-circular in extent, but the adjacent ends of these two semi-circles are connected by short radial bends 32$^b$. The third groove 33 is a true circle.

Any suitable means may be provided to operate the actuator coincidentally with the running of the vehicle and at any desired speed relative to that of the vehicle. To this end I show the periphery of the bottom of the actuator provided with gear teeth 34 meshing with a spur gear 35 carried by an axle 36 mounted in the frame 30 constituting a part thereof. The gear 35 includes also a sprocket gear 37 which coöperates with the sprocket chain 38 running over a small sprocket wheel 39 on the driving axle 17. The design of these gears is such that the actuator will be rotated at a relatively low speed.

The connecting means between the actuator disk and the connector consist essentially of a rod 40 which may be termed hereinafter an adjuster. The adjuster is pivoted at one end 41 on the pin 21 and has at its rear end a finger or hook 42 coöperating with the actuator as by projecting into one of the grooves aforesaid. Between its ends the adjuster is provided with a rigid finger 43 projecting downward into any selected one of a series of holes 44 formed in an arc shaped rear end portion 45 of the connector 20. The adjuster having constant connection at the end 41 with the pin 21 and being adapted to be adjusted laterally across the face of the disk and around the pin 21 as a center, the holes 44 are arranged in an arc of a circle whose center is 21. With the hook 42 projected into any one of the grooves 31, 32 or 33 and at either side of the center 28, the adjuster will be held from oscillation around the center pin 21, subject to the variation in form of the grooves, and so with the projection of the finger 43 into one of the holes 44 the adjuster and connector are locked together for unitary movement. Now, therefore, with the rotation of the actuator as will be appreciated from Figs. 2 and 3 the hook portion of the adjuster will maintain a constant distance from the pivot of the connector and will be maintained in the groove into which it is adjusted either by its own resiliency or in connection with a spring 46 surrounding the pin 21 and located between the head 41 of the adjuster and the head at the upper end of the pin. Therefore any lateral or radial variation in the form of the groove in which the hook is located will cause a corresponding turning or oscillation of the connector around its pivot 21, and with respect to the groove 31 which is made up of the continued succession of relatively short lateral bends the vehicle will be steered so as to make corresponding right or left turns in succession. When the adjuster is located in the groove 32 the finger 43 will be projected into the next hole 44 of the series and with the hook in the concentric portion 32$^a$ the steering members or wheels 11 will be directed forward or straight-away. When the actuator has rotated sufficiently to bring the hook 42 into one of the bends 32$^b$ the first effect will be to cause the vehicle to be steered toward the right and by proper design or timing of the shape and speed of the actuator this initial turn amounts preferably to a steering of the vehicle 180 degrees whereby it is caused to travel first a straight course and then make a half turn and then return along a straight course parallel to the outward straight course. The second half of the short turn 32$^b$ serves automatically to change the course of the vehicle from its turning into its straight returning direction. A single bend 32$^b$ in the groove 32 is sufficient for this purpose, but if it is desired for the vehicle to turn or double upon its course more frequently more of the sharp bends may be provided. With the adjuster fitted into the concentric circular groove 33 and with the finger 43 in the next hole 44 the vehicle is held to a straight-away course. The holes 44 are duplicated on the opposite side of the center of the connector for several reasons among which are: First, to afford the child more interest and experience in the manipulation of the mechanism and studying its behavior, and secondly by the application of the adjuster to the opposite side of the center 28 of the actuator, what in one case would cause a right turn would in the other case cause a left turn of the vehicle.

In Figs. 6 and 7 the steering means is a rudder 11', the actuator is the disk 27 the same as shown in the first figures and having similar grooves for coöperation with the adjuster 40'. The connector 20' is a lever connected to or forming a part of the rudder and pivoted for oscillation around a vertical axis 21' in a bearing 22' having braces 30' to the deck or other portion of the vehicle 10'. The member corresponding to the arc-shaped rear end 45 above described, is a bar 45' rigidly connected to the rear end of the connector 20' and having a series of lugs 44' formed along one side thereof, as for example the top side as shown. The front end or head 41' of the adjuster embraces the bar 45' and has an opening 47 to permit of the adjustment of the head along the bar so as to pass the lugs or to engage any one of any selected one of them in a notch 48 formed in the head. The rear end of the adjuster coöperates with the grooves in the manner above described and serves also to hold the adjuster in its locked position with respect to the bar 45' in practice. To change the adjustment the operator springs downward on the middle portion of the adjuster so as to cause the head thereof to clear the lug and permit it to be slipped to another lug while the hooked end of the adjuster is placed into another groove. The adjuster is rigid enough, however, to effect the desired automatic lateral adjustments of the steering means.

In the modification of Figs. 8 and 9 I show my improvement in connection with a front wheel driving vehicle, although other driving means may be employed auxiliary to the power devices indicated. In this form of the invention the front wheels 11ᵃ instead of being mounted on steering knuckles as in Figs. 2 and 3 are journaled on a rigid axle 13', and hence are always parallel to the line of movement. Each of these wheels is provided with a friction face 49 with which coöperates a friction wheel 50 mounted on a vertical axis 51 carried by a support 22ᵃ. These wheels 50 have constant contact with the friction faces 49 and are driven simultaneously from any suitable motor 52, or its equivalent, through a shaft 53 and gearing such as a worm 54 and worm wheel 55, the latter being mounted slidably on a shaft 56 parallel to the axle 13'. To the ends of this shaft 56 are fixed friction wheels 57 coöperating respectively with the wheels 50 and normally at the same distances from the centers 51 thereof. Fixed to the shaft 56 near its ends are a pair of collars 58 with which yokes 59 coöperate, the yokes being connected by a reach rod 18' always parallel with the axle 56. The connector 20ᵃ is pivoted at 21ᵃ on the support 22ᵃ, and at its front end has pin and slot connection 23' with the reach rod. The rear end portion 45 of the connector is the same as described in connection with the first modification, the same having an arc shaped series of holes 44 formed therein, the series being concentric with the pivot 21ᵃ. The actuator is or may be the same as in Figs. 1 and 2 and is shown as having a similar form of adjuster 40ᵃ with the connector. As already described this actuator may be driven through a sprocket chain on the rear axle, not shown.

Assuming that the vehicle is operating toward the left in Fig. 8 driven by the front wheels alone or in connection with any other suitable driving means, the friction gears are driven as indicated by the arrows and if the wheels 57 are midway between the pivots 51 the wheels 49 will be driven at the same speed and being of the same diameter the vehicle will not be guided or steered laterally. When, however, the actuator through the adjuster and connector causes the shifting of the reach rod and yokes laterally the axle 56 will likewise be shifted through the hub 16 of the worm gear 55 so as to bring one of the wheels 57 nearer to and the other farther from its adjacent pivot support 51. Therefore the wheels 50 will be driven at different speeds and the wheels 49 will be driven accordingly at different speeds causing the right or left turn of the vehicle. As a toy this form of the invention is especially useful not only for amusement but for its educational properties in teaching a boy or girl the mechanics of frictional driving means as well as the many other features involved in its construction. These devices in the several forms indicated and others that have been made within the spirit of the invention is of a practical nature and may be manufactured at a relatively low cost, and in practice is both serviceable and attractive.

I claim:

1. In an automatic steering device, the combination with a vehicle having steering means movable laterally, an actuator having a plurality of grooves of varying radii, means to rotate the actuator around an axis, a connector coöperating with the steering means, and an adjuster adjustably connected with the connector and coöperating with any selected one of the actuator grooves whereby when the actuator is rotated the steering means will be given a lateral oscillation to cause the vehicle to turn to the right or left.

2. In a device of the character set forth, the combination of a vehicle, steering means connected thereto for oscillation around an axis perpendicular to the direction of movement of the vehicle, a connector attached to the steering means, a rotatable disk-shaped actuator, an adjuster selectively adjustable with respect to the connector and operating therewith as a rigid member after adjustment, and variable and selective driving connections between the actuator and the adjuster.

3. The combination with a vehicle, of steering means therefor, a connector attached to the steering means, said connector comprising a lever pivoted between its ends on a fixed pivot and the attachment means between the same and the steering means including a link, an actuator, an adjuster adjustably connected to the connector and coöperating therewith as a single rigid member after adjustment, and variable and selective driving connections between the actuator and the adjuster.

4. The combination with a vehicle, of steering means therefor, a connector, means to connect the connector to the steering means, a disk-shaped actuator, means to rotate the actuator in accordance with the movement of the vehicle, an adjuster comprising a long rigid member having interlocking coöperation with the connector and acting therewith as a single rigid member after adjustment, and variable and selective driving connections between the actuator and the adjuster.

5. The combination with a vehicle, of steering means therefor, a connector comprising a pivoted lever having a laterally projecting end, pivoted means attaching the opposite end of the connector to the steering means, an actuator, means to move the actuator in accordance with the movement of the vehicle, an adjuster comprising a rigid member pivoted to move around the same pivot as the connector and having adjustable interlocking connection with the laterally projecting end of the connector whereby the adjuster and connector operate after adjustment as a single rigid member, and selective driving connections between the actuator and the adjuster.

6. In a device of the class set forth, the combination with a steering member for a vehicle and driving means for the vehicle, of automatic steering means comprising a rotatable disk having formed on one face a plurality of independent endless grooves surrounding the axis of the disk and each groove having variable radii, means to drive the disk from the driving means aforesaid, and connections between the steering member and the disk including a rigid member having an end engageable in any groove of the disk.

7. In a vehicle, the combination with a steering means and driving means, of automatic steering devices including a rotatable disk having on one face a plurality of independent endless grooves of variable radii and a plurality of connecting members between the disk and the steering member, said connecting members having adjustable interlocking connection with one another so as to act as a unitary rigid member after adjustment, and one of said members having an end engageable selectively in any one of said endless grooves, substantially as set forth.

RAYMOND DE FILIPPIS.